United States Patent [19]

Spencer

[11] 4,006,893
[45] Feb. 8, 1977

[54] SPRINGS

[76] Inventor: William Wilfred Spencer, 5 Tottenham Road, Baysville, East London, Cape Province, South Africa

[22] Filed: Apr. 15, 1976

[21] Appl. No.: 677,118

[30] Foreign Application Priority Data

Apr. 17, 1975 South Africa ...................... 75/2463

[52] U.S. Cl. .............................. 267/61 S; 254/10.5
[51] Int. Cl.² ......................................... F16F 1/12
[58] Field of Search ............ 267/61 S, 61 R, 60 R, 267/58, 156; 254/10.5; 29/218, 219

[56] References Cited

UNITED STATES PATENTS 2,274,227  2/1942  Willard ................................ 267/58
3,014,713  12/1961  Fenton ............................ 254/10.5
3,866,896  2/1975  Wehner ........................... 267/61 S

FOREIGN PATENTS OR APPLICATIONS 978,240  12/1964  United Kingdom ............. 267/61 S Primary Examiner—James B. Marbert
Attorney, Agent, or Firm—Ladas, Parry, Von Gehr, Goldsmith & Deschamps

[57] ABSTRACT

A device for strengthening a coil spring comprising a torsion spring having a helical formation and two arms that are engageable with the coil spring. A deformable plastics body, such as polyurethane, is received within the helical formation resistively to oppose a reduction of the diameter of the formation whereby the device has a progressive action.

4 Claims, 2 Drawing Figures

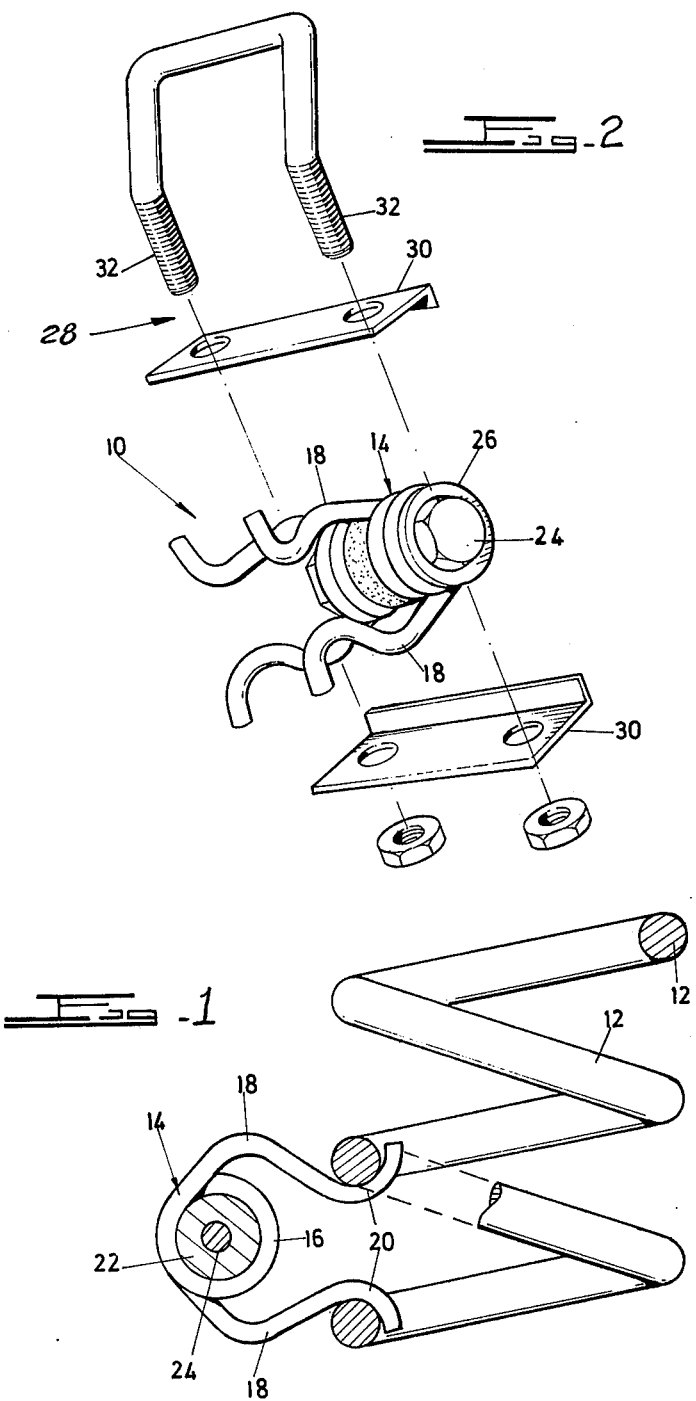

SPRINGS

This invention relates to springs in general and more particularly the invention is concerned with a device for strengthening a coil spring.

Coil springs are, for example, used in motor vehicle suspensions. With use, these springs lose a portion of their resilience and sag. This causes the geometry of the suspensions to be altered resulting in less than optimum performance of the vehicle. The performance of the vehicle is also adversely affected when the springs are abnormally stressed, for instance by carrying a too heavy load in the vehicle or by towing a caravan. In these circumstances it is desirable to strengthen or supplement the resilience of the coil springs.

It is an object of the invention to provide a device for strengthening a coil spring which is inexpensive and simple to fit on the spring.

According to the invention there is provided a device for strenghtening a coil spring including a torsion spring having a helical formation with an arm extending generally tangentially from each end of the formation, each of the arms having a hook for engaging a coil of a coil spring.

Preferably a deformable plastics body, such as a polyurethane body, is accommodated inside the torsion spring. The body acts resistively increasingly to oppose a reduction in the diameter of the torsion spring caused by compression of a coil spring to which the device is connected. This provides the coil spring with a progressive action whereby its stiffness increases as increasing loads are applied to it, i.e. as it is compressed.

The invention is further discussed with reference to the accompanying drawings in which:

FIG. 1 shows a side view, partly in section of a strengthening device of the invention fitted to a coil spring; and FIG. 2 shows a perspective view of a preferred embodiment of the strengthening device of the invention, the device being received in a clamp, which is shown exploded, so that it may be fitted to a coil spring.

In the drawings a coil spring strengthening device is shown fitted to a coil spring 12. The device comprises a rod of spring steel bent to form a torsion spring 14 having a cylindrical, helical formation 16 with an arm 18 projecting generally tangentially from each end of the formation 16. The arms may be straight or curved as desired. Each arm has a hook 20 formed towards its end, the hook 20 being shaped to engage with a snug fit a coil of the coil spring. A sleeve 22 of hard polyurethane or the like which can be resistively deformed is accommodated inside the helical formation 16. A bolt 24 passes through the inside of the sleeve and, as best seen in FIG. 2, has a large diameter washer 26 at each end which serves to contain two similar torsion springs 14 on the sleeve 22 and to prevent them from twisting relatively to each other so that their axes are inclined. The hooks 20 on the pairs of torsion springs in pairs define a channel for engaging a coil of a coil spring; the channels are maintained parallel to each other in use because the torsion springs are prevented from twisting by the bolt 24. Thus, the device cannot, in use, twist so that it becomes ineffective.

In FIG. 2 a clamp 28 for compressing the device is shown. The clamp 28 comprises two plates 30 which are each L-shaped in cross-section and two bolts 32 which pass through registering holes formed in the plates 30. In practice, when the bolts 32 are tightened the plates 30 are forced against the arms 18 of the torsion spring and compress them.

The devices are simply fitted to a coil spring by expanding the coil spring and inserting the arms 18 between adjacent coils of the coil spring when the torsion spring 14 is in a compressed state.

The clamp is then opened so that the torsion spring expands and the hooks 20 engage the coils of the coil spring. Finally the coil spring is allowed to return to its initial condition. For a motor vehicle coil spring, the expansion thereof is performed by jacking the vehicle.

In order to remove the torsion spring the clamp is once again fitted to the torsion spring and then compressed. The coil spring is then expanded so that the torsion spring may be removed from it.

In practice, the strengthening device of the invention is fitted in pairs to a coil spring, the devices being positioned diagonally opposite each other. Increased strengthening of the coil spring is accomplished by fitting further pairs of the devices. In this event care must be taken to ensure that the devices are uniformly spaced around the circumference of the coil spring.

In use when a load is applied to the coil spring it is compressed and in so doing compresses the arms 18 of the torsion spring 14 towards each other. This causes the diameter of the torsion spring to be reduced and the sleeve 22 to be squeezed between the helical formation and the bolt. The compression of the coil spring is thus opposed by the resilience of the torsion spring and by the frictional resistance of the sleeve. The frictional resistance of the sleeve increases as it is squeezed and for this reason provides an increasingly greater resistance to compression of the coil spring. Hence, the device of the invention provides a progressive action for the coil spring whereby the suspension only becomes stiffer as it is compressed. If fitted to a coil spring of a motor vehicle it will, thus, not make the suspension "hard".

The torsion spring may be secured in position by means of a clamp comprising a hook-and-channel arrangement whereby the hook engages a coil of the coil spring from below and the coil is clamped by tightening the channel member on to the top of the coil by means of a nut, the free end of the hook being threaded and passing through an orifice in the channel member.

What I Claim Is:

1. A device for strengthening a coil spring comprising a torsion spring having a helical formation with an arm extending generally tangentially from each end of the formation, each of the arms having a hook for engaging a coil of a coil spring, and a deformable body accommodated within the helical formation resistively to oppose a reduction of the diameter of the helical formation, the deformable body being in the form of a sleeve, and a stiff incompressible rod being snugly received inside the sleeve.

2. A device according to claim 1, including two similar torsion springs mounted on a common body, and means for preventing relative twisting of the springs, each hook of one of the torsion springs defining with a corresponding hook of the other torsion spring a channel for engaging a coil of a coil spring.

3. A device according to claim 2, wherein the incompressible rod is a bolt adapted to secure the springs together to prevent relative twisting.

4. A device according to claim 3, wherein the deformable sleeve is of polyurethane.

* * * * *